United States Patent Office 3,227,878
Patented Jan. 4, 1966

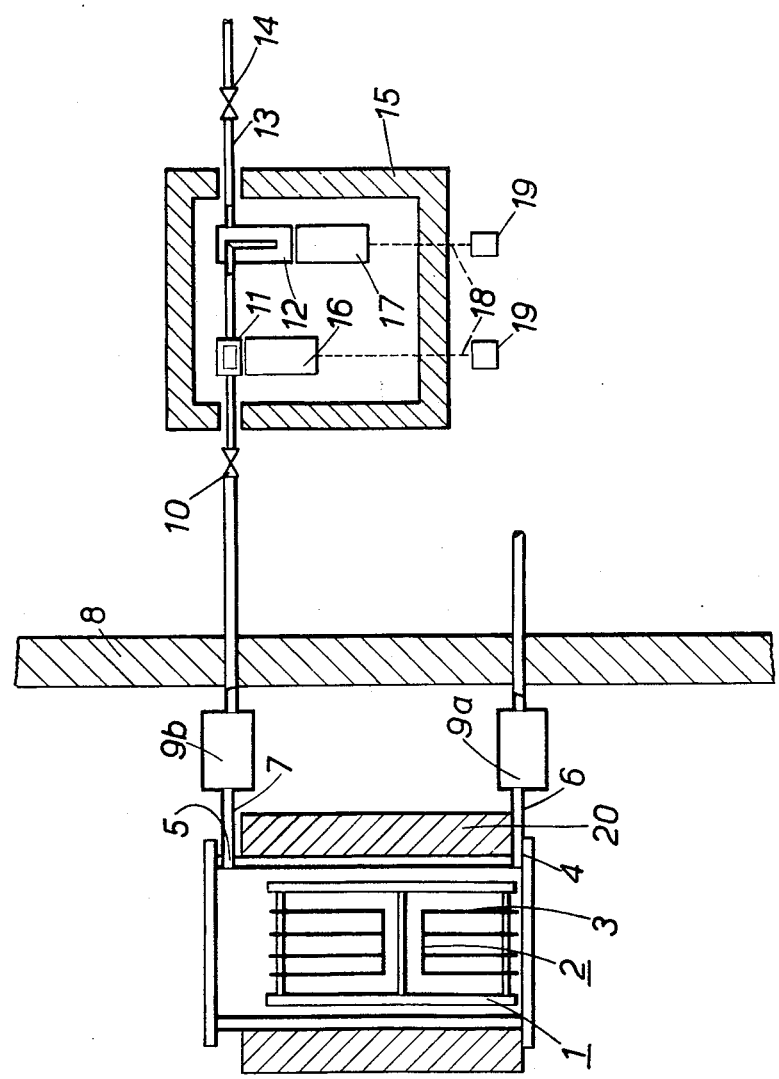

3,227,878
TESTING OF FUEL ELEMENTS FOR
NUCLEAR REACTORS
John Syme Nairn and Arthur William Shilling, Seascale, England, assignors to United Kingdom Atomic Energy Authority, London, England
Filed July 26, 1963, Ser. No. 297,756
Claims priority, application Great Britain, Aug. 3, 1962, 30,077/62
2 Claims. (Cl. 250—83.3)

This invention relates to the testing of fuel elements for nuclear reactors and is concerned with fuel elements of the type in which uranium dioxide fuel is enclosed in protective sheaths to form fuel rods. It is an object of the present invention to provide a method of testing such fuel rods after irradiation to determine whether a rod is leaking, that is, has a defective sheath such that fission products can escape through it.

The method of testing according to the invention comprises the steps of heating an irradiated fuel rod comprising uranium dioxide fuel enclosed in a protective sheath so that the crystal structure of the uranium dioxide in a leaking sheath will be changed, and testing the surrounding atmosphere for the presence of fission products released from the uranium dioxide as a result of the change in crystal structure.

Radioactive fission products released in significant quantities by a leaking fuel rod will be krypton-85, xenon-133 and iodine-131. The heating step may be carried out in an oxidising atmosphere so that the crystal structure in a leaking fuel rod is changed by oxidation of the uranium dioxide to a higher oxide. This oxidation may be effected by heating to 300–400° C. in air or oxygen, for example. Higher temperatures oxidise the uranium dioxide more rapidly but may lead to distortion of the fuel rod sheath.

An example of one way of carrying the invention into effect will now be described with reference to the accompanying drawing which is a diagrammatic medial section.

In the drawing is shown a fuel element assembly 1 comprising two clusters 2 of fuel rods 3 arranged about a common axis. Each fuel rod 3 comprises uranium dioxide fuel enclosed in a protective sheath. The fuel element assembly 1 is supported in a furnace 20 having an inlet 4 and outlet 5 fitted with pipes 6 and 7 respectively passing through shielding 8. Iodine filters 9a, 9b are provided in the pipes 6, 7. The pipe 6 is connected to an air supply (not shown). The pipe 7 is connected via a valve 10 to a beta counting cell 11 and charcoal trap 12. The trap 12 has an outlet pipe 13 fitted with a valve 14. Lead shielding 15 surrounds the cell 11 and trap 12. A beta-sensitive crystal assembly 16 is associated with the cell 11 and a gamma-ray sensitive crystal 17 with the trap 12. Electrical connections 18 from the crystal assemblies 16, 17 pass through the shielding 15 to conventional counting instruments 19.

In carrying out the method of the invention in the apparatus described with reference to the drawing a fuel element assembly 1 is disposed in the furnace 20 as shown and the temperature in the furnace is raised to between 300° and 400° C. A stream of air is then passed through the furnace 20, entering through the inlet 4 and leaving through the outlet 5. From the outlet 5 the air passes through the pipe 7, iodine filter 9b and open valve 10 to the cell 11 and trap 12. The trap 12 is immersed in liquid oxygen at —183° C. and gamma counting is continuous during the passage of the air stream which leaves the trap 12 through the outlet pipe 13 and open valve 14. The beta-emission from the fission products collected in the trap 12, however, is counted at the end of the test. The valves 10 and 14 are then closed and the liquid oxygen bath is replaced by a furnace at 100–200° C. so that the collected fission products are boiled off and fill the space between the valves 10 and 14, including the cell 11. The beta activity in the cell 11 is then determined.

It is possible to count the beta activity continuously as the air stream passes through the cell 11 but this is much less sensitive.

The air stream may be replaced by helium, carbon dioxide or a high vacuum. The furnace is then heated to at least 500° C.

The method of the invention is particularly suitable for testing clusters of fuel rods without breaking up the clusters.

We claim:
1. A method of testing an irradiated nuclear fuel rod comprising uranium dioxide fuel enclosed in a protective sheath, to determine whether the rod is leaking, said method comprising the steps of heating the fuel rod in an oxidising atmosphere in a furnace outside a nuclear reactor so that the crystal structure of the uranium dioxide in a leaking sheath will be changed, and testing the surrounding atmosphere for the presence of fission products released from the uranium dioxide as a result of the change in crystal structure.
2. A method of testing according to claim 1 wherein the fuel rod is heated to 300–400° C.

References Cited by the Examiner
UNITED STATES PATENTS
3,005,765  10/1961  Marshall _____ 176—58

FOREIGN PATENTS
915,338   1/1963   Great Britain.
915,339   1/1963   Great Britain.
917,937   2/1963   Great Britain.
37–4096   6/1962   Japan.

OTHER REFERENCES
Proceedings of 2nd Geneva Conference, 1958, vol. 8, pp. 159–162 and 499–501.
Belle: "Uranium Dioxide," 1961, pp. 264–271 and 667, published by AEC.

BENJAMIN R. PADGETT, (Acting) Primary Examiner.

CARL D. QUARFORTH, REUBEN EPSTEIN, Examiners.

M. R. DINNIN, Assistant Examiner.